(12) United States Patent
Van Veen et al.

(10) Patent No.: US 12,015,886 B2
(45) Date of Patent: Jun. 18, 2024

(54) CONTROL OF OPTICAL-MODULATION AMPLITUDE FOR BURST-MODE TRANSMISSION

(71) Applicant: Nokia Solutions and Networks OY, Espoo (FI)

(72) Inventors: Doutje Van Veen, New Providence, NJ (US); Vincent Houtsma, New Providence, NJ (US); Amitkumar Mahadevan, Edison, NJ (US); Edward Harstead, Jay, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 311 days.

(21) Appl. No.: 17/495,076

(22) Filed: Oct. 6, 2021

(65) Prior Publication Data
US 2023/0107882 A1 Apr. 6, 2023

(51) Int. Cl.
*H04Q 11/00* (2006.01)
*H04B 10/27* (2013.01)
*H04B 10/293* (2013.01)
*H04B 10/564* (2013.01)
*H04J 14/02* (2006.01)

(52) U.S. Cl.
CPC ......... *H04Q 11/0067* (2013.01); *H04B 10/27* (2013.01); *H04B 10/293* (2013.01); *H04B 10/564* (2013.01); *H04J 14/0282* (2013.01); *H04Q 2011/0049* (2013.01)

(58) Field of Classification Search
CPC ........ H04Q 11/0067; H04Q 2011/0049; H04B 10/27; H04B 10/293; H04B 10/564; H04B 10/272; H04J 14/0282
See application file for complete search history.

(56) References Cited

U.S. PATENT DOCUMENTS

| | | |
|---|---|---|
| 6,587,489 B2 | 7/2003 | Schrödinger |
| 6,901,091 B2 | 5/2005 | Schrödinger |
| 7,068,691 B2 | 6/2006 | Chujo et al. |
| 8,903,254 B2 | 12/2014 | Hu et al. |

(Continued)

FOREIGN PATENT DOCUMENTS

| | | | |
|---|---|---|---|
| JP | 2006197489 A | * | 7/2006 |
| JP | 6013997 B2 | * | 10/2016 |

OTHER PUBLICATIONS

Cablelabs, "100G Single-Wavelength Passive Optical Network Coherent PON (CPON)", Web Presentation (Mar. 2021): 1-31.

(Continued)

*Primary Examiner* — Leslie C Pascal
(74) *Attorney, Agent, or Firm* — Mendelsohn Dunleavy, P.C.; Steve Mendelsohn (57) ABSTRACT

Various embodiments of the disclosed PON system enable approximate leveling of the optical-modulation amplitudes in a sequence of optical bursts received by a system's OLT from a plurality of ONUs. Some embodiments additionally enable approximate leveling of the average optical power, received at the OLT from different ONUs, in such a sequence. Some embodiments may rely on control messaging between the OLT and ONUs to perform one or both types of leveling. The disclosed leveling may advantageously provide an effective tool for optimizing upstream transmission for high-speed TDM-PONs.

23 Claims, 5 Drawing Sheets

(56) References Cited

U.S. PATENT DOCUMENTS

| | | | |
|---|---|---|---|
| 8,923,672 | B2 | 12/2014 | Bernasconi et al. |
| 9,614,351 | B1 | 4/2017 | Asmanis et al. |
| 10,148,357 | B1 | 12/2018 | Cirit et al. |
| 10,461,882 | B2 | 10/2019 | Lee et al. |
| 10,790,636 | B1 | 9/2020 | Abdelhalim et al. |
| 2009/0080891 | A1* | 3/2009 | Kazawa ............... H04J 3/0682 398/79 |
| 2018/0337734 | A1 | 11/2018 | Gao |
| 2019/0305854 | A1 | 10/2019 | Campos et al. |
| 2019/0319712 | A1 | 10/2019 | Zhang et al. |
| 2020/0204263 | A1 | 6/2020 | Zhou et al. |
| 2020/0280772 | A1* | 9/2020 | Yang .................. H04B 10/294 |
| 2020/0296487 | A1* | 9/2020 | Bonk ................. H04J 14/0221 |
| 2021/0289274 | A1* | 9/2021 | Khotimsky ........ H04Q 11/0067 |
| 2022/0069904 | A1* | 3/2022 | Lee ................. H04B 10/07955 |

OTHER PUBLICATIONS

Kaneda, Noriaki, et al. "Coherent PON: System Merit and Technical Challenges." 26th Optoelectronics and Communications Conference. Hong Kong, China. Jul. 3-7, 2021. paper W2B.1 (2021): 1-3.

Coudyzer, Gertjan, et al. "Study of burst-mode adaptive equalization for >25G PON applications." Journal of Optical Communications and Networking 12.1 (2020): A104-A112.

Lavery, Domaniç, et al. "Opportunities for Optical Access Network Transceivers Beyond OOK." Journal of Optical Communications and Networking 11.2 (2019): A186-A195.

Liu, Zhixin, et al. "Optical Injection-Locked Directly Modulated Lasers for Dispersion Pre-Compensated Direct-Detection Transmission." Journal of Lightwave Technology 36.20 (2018): 4967-4974.

Schrenk, Bernhard, et al . . . "Low-Cost Analogue Coherent TDMA Receiver with All-Optical Synchronization to Free-Running Optical Carriers." 2019 Optical Fiber Communications Conference and Exhibition (OFC). San Diego, CA, USA. Mar. 3-7, 2019. IEEE (2019): 1-3.

Schrenk, Bernhard, et al. "Simple laser transmitter pair as polarization-independent coherent homodyne detector." Optics Express 27.10 (2019): 13942-13950.

Velásquez, J. Camilo, et al. "Simultaneous DPSK-ASK modulated dual-EML transmitter for coherent UDWDM-PON." Optical Fiber Communication Conference. Optical Society of America, 2018. (Abstract).

Simon, Gael, et al. "550Gb/s TDM PON Digital Signal Processing Challenges: Mining current G-PON Field Data to Assist Higher Speed PON." 2020 European Conference on Optical Communications (ECOC). paper Tu2J.7, IEEE (2020): 1-4.

ITU-T, Recommendation G.988 "ONU management and control interface (OMCI) specification." Amendment 4 (Apr. 2021): 1-682.

ITU-T, Recommendation G.9804.2 "Higher Speed Passive Optical Networks: Common Transmission Convergence Layer Specification." (Sep. 2021): 1-235.

ITU-T, Recommendation G.9804.3 "50-Gigabit-capable passive optical networks (50G-PON): Physical media dependent (PMD) layer specification." (Sep. 2021): 1-41.

Kaneda, Noriaki, et al. "Dual polarized EML (Externally Modulated Laser) with injection locked lasers." Presentation (Apr. 2021): 1-4.

* cited by examiner

CONTROL OF OPTICAL-MODULATION AMPLITUDE FOR BURST-MODE TRANSMISSION

BACKGROUND

Field

Various example embodiments relate to optical communication equipment and, more specifically but not exclusively, to equipment for optical burst, passive-optical-network systems.

Description of the Related Art

This section introduces aspects that may help facilitate a better understanding of the disclosure. Accordingly, the statements of this section are to be read in this light and are not to be understood as admissions about what is in the prior art or what is not in the prior art.

A passive optical network (PON) typically has a point-to-multipoint architecture in which one or more passive optical splitters are used to enable a single optical transmitter to broadcast data transmissions to multiple optical receivers. An example PON includes an optical line terminal (OLT) at the service provider's central office (CO) and a plurality of optical network units (ONUs) near or at the individual end users, such as residences, businesses, radio towers, etc. Downstream signals are usually broadcast to all ONUs or at least a group of ONUs. Upstream signals are routed using a multiple access protocol, e.g., time division multiple access (TDMA). A PON is capable of advantageously reducing the amount of fiber, CO equipment, and active traffic-management equipment, e.g., compared to that required for point-to-point architectures.

An ONU in a PON may employ a burst-mode optical transmitter. An OLT of the PON is typically configured to interact with a plurality of optical transmitters of the ONUs.

SUMMARY OF SOME SPECIFIC EMBODIMENTS

Various embodiments of a disclosed PON system enable approximate leveling of the optical-modulation amplitudes in a sequence of optical bursts received by the system's OLT from a plurality of ONUs. Some embodiments additionally enable approximate leveling of the average optical power, received at the OLT from different ONUs, in such a sequence. Some embodiments may rely on control messaging between the OLT and ONUs to perform one or both types of leveling, i.e., OMA leveling and/or average-optical-power leveling. The disclosed leveling may advantageously provide an effective tool for optimizing upstream transmission for high-speed time-division-multiplexing (TDM)-PONs.

According to an example embodiment, provided is an apparatus, comprising an optical line terminal to optically communicate with a plurality of optical network units, the optical line terminal including an optical data receiver to receive a sequence of optical bursts from different ones of the optical network units, and further including an optical data transmitter; and wherein the optical data transmitter is operable to transmit first control messages to individual ones of the optical network units, each of the first control messages enabling a respective one of the optical network units to change an optical-modulation-amplitude (OMA) level thereat such that, at the optical line terminal, differences between OMA levels of the optical bursts received from the different ones of the optical network units become smaller than a first threshold value.

According to another example embodiment, provided is an apparatus, comprising an optical network unit including an optical transmitter and an optical receiver and being configured to communicate with a remote optical line terminal of a burst-mode, passive optical network; and wherein the optical network unit is configured to adjust the optical transmitter during or near optical transmission therefrom to approximately set an optical modulation amplitude of the optical transmitter received at the remote optical line terminal to a target value.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

The International Telecommunication Union's Telecommunication Standardization Sector (ITU-T) promulgated the G.9804 series of recommendations directed at higher speed PONs. In the corresponding TDM PONs and Time and Wavelength Division Multiplexing (TWDM) PONs, at least the upstream transmissions can be carried out in a burst mode. A burst-mode optical transmitter may employ a directly modulated laser (DML) or an externally modulated laser (EML). In some literature, the acronym EML may also stand for "Electro-absorption Modulated Laser," which is a particular type of externally modulated laser.

A DML typically uses a distributed feedback structure with a diffraction grating in the corresponding waveguide for direct modulation and, as such, may sometimes be referred to as a distributed-feedback (DFB) laser. In a DML, data are placed on the optical beam by modulating the injection current, which may be directly applied to the laser-diode chip to generate a corresponding modulated optical signal.

An EML is typically implemented as a laser diode with an external optical modulator, e.g., typically an electro-absorption modulator (EAM). The laser diode section of an EML may be similar to that of a DML, but may be operated under a (quasi) continuous-wave (CW) condition. The data signal is applied to the EAM section to generate a modulated optical signal. Thus, the process of modulation does not affect the laser properties of an EML the way it does in a DML. As a result, EMLs may be more stable and/or have lower optical chirp than DMLs and may be better suited for telecom applications requiring higher modulation speeds (e.g., >25 GBaud/s) and longer transmission distances (e.g., up to 40 km).

A next generation of PON systems is likely to rely on digital signal processing, mostly at the data receiver, to achieve the desired performance benchmarks and cost-effectiveness (see, e.g., ITU-T G.hsp 50G TDM-PON). Most types of such digital signal processing rely on the input-signal linearity. In the upstream direction of a PON, the ONUs transmit their optical signals using a TDMA protocol, which causes the transmissions from different ONUs to arrive at the OLT in a sequence, e.g., in a time-interleaved manner. Due to the different transmission distances and optical paths between the OLT and different ONUs, the optical-power difference between the optical signals received from different ONUs can be ca. 20 dB or even higher. As a result, the electrical amplifiers, e.g., the transimpedance amplifier (TIA) and post-amplifier, employed in the burst-mode receiver of the OLT need to be capable of quickly adapting their gains for each incoming optical burst, e.g., for proper clock- and data-recovery (CDR) processing, etc. However, the high dynamic-range, high linearity, and fast adaptability requirements to the amplifiers tend to make them disadvantageously relatively complex and/or expensive.

At least some of the above-indicated problems in the state of the art can be addressed using at least some embodiments disclosed herein. For example, some embodiments are capable of individually adapting the optical modulation amplitude (OMA) for each ONU such that the OMA levels received at the OLT can be approximately constant across a sequence of bursts received from different ONUs. Such embodiments can beneficially be used, e.g., to greatly relax at least some of the above-mentioned requirements to the electrical amplifiers of the burst-mode optical data receiver, thereby enabling lower-cost implementations thereof for mass deployment.

The OMA of a modulated optical signal can be defined, e.g., using Eqs. (1)-(5). For example, for ON/OFF Keying (OOK) modulation, the OMA depends on the ON and OFF optical-power levels (labeled as $P_1$ and $P_0$, respectively) as follows:

$$OMA = P_1 - P_0 \quad (1)$$

The corresponding extinction ratio, $r_e$, and average optical power, $P_{avg}$, are given by Eqs. (2) and (3):

$$r_e = P_1/P_0 \quad (2)$$

$$P_{avg} = (P_1 + P_0)/2 \quad (3)$$

Eq. (4) expresses the OMA in terms of the extinction ratio and average optical power:

$$OMA = 2P_{avg} \frac{r_e - 1}{r_e + 1} \quad (4)$$

Eq. (5) expresses the extinction ratio in terms of the OMA and average optical power:

$$r_e = \frac{OMA + 2P_{avg}}{2P_{avg} - OMA} \quad (5)$$

Similar equations can be written for other amplitude- or intensity-modulation formats, e.g., for pulse-amplitude modulation (PAM) and for quadrature-amplitude modulation (QAM).

Some embodiments may enable both the received average optical-power levels and OMA levels, i.e., levels received at the optical receiver of the OLT, to be approximately constant across the sequence of bursts received from different ONUs. Such embodiments may advantageously enable further streamlining of the electrical amplifiers employed in the burst-mode optical data receiver of the OLT. For example, the use of a relatively simple constant-gain TIA in such embodiments may be sufficient to produce good signal linearity for nearly optimal signal equalization in the digital-signal-processing (DSP) chain of the receiver.

Figure 1:
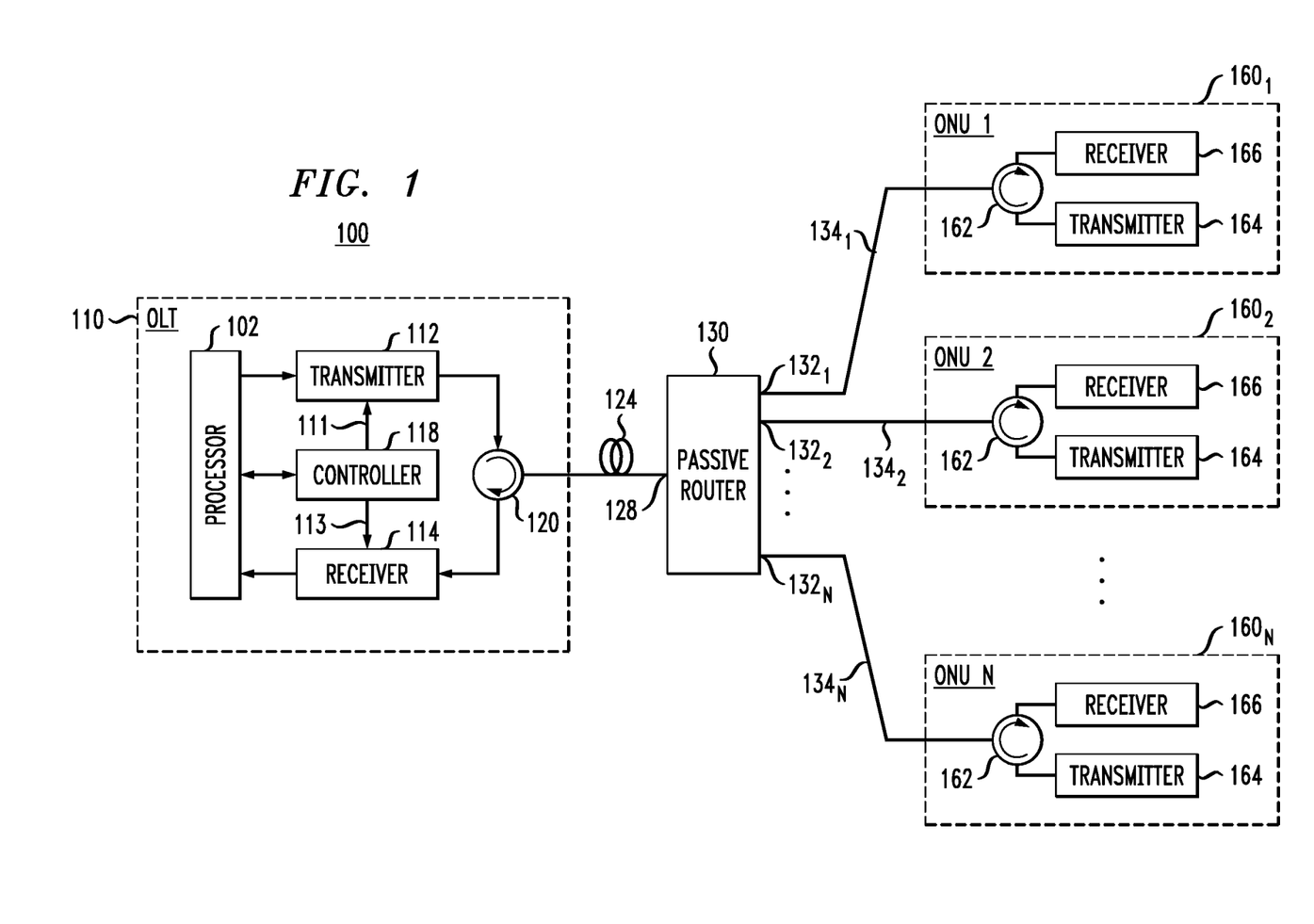
FIG. 1 shows a block diagram of an example PON system in which various embodiments can be practiced.

FIG. 1 shows a block diagram of a PON system 100 in which various embodiments can be practiced. System 100 has an OLT 110 configured to communicate with ONUs $160_1$-$160_N$. The number N can be, e.g., in the range of 2 to 300. In some cases, all of the ONUs $160_1$-$160_N$ can be configured to use (nominally) the same carrier wavelength for upstream transmissions. In some other cases, different groups of the ONUs $160_1$-$160_N$ can be configured to use different respective carrier wavelengths for upstream transmissions.

An example OLT 110 comprises an optical data transmitter 112 and an optical data receiver 114, both coupled, by way of an optical circulator 120 or other suitable directional optical coupler (e.g., an optical diplexer or triplexer based on thin-film technologies), to an optical fiber 124. Operation, functions, and configurations of transmitter 112 and receiver 114 can be managed and controlled using control signals 111 and 113 generated by an electronic controller 118. A processor 102 that is coupled to transmitter 112, receiver 114, and controller 118 can be used for signal and data processing and, optionally, for supporting some functions of the controller. In an example embodiment, optical fiber 124 can have a length between about 1 km and about 40 km.

Transmitter 112 is configured to broadcast downstream optical signals to ONUs $160_1$-$160_N$ using one or more downstream carrier wavelengths, with time-division multiplexing (TDM) being used to transmit signals intended for different ONUs. Receiver 114 is configured to receive upstream optical signals from ONUs $160_1$-$160_N$ transmitted using one or more upstream carrier wavelengths. A suitable TDMA protocol executed using controller 118 is typically used to prevent collisions, at receiver 114, between the upstream signals generated by different ONUs $160_n$, where n=1, 2, . . . , N.

Optical fiber 124 connects OLT 110 to a passive optical router 130. Depending on the embodiment, router 130 can be implemented using: (i) a (1×N) passive optical splitter/combiner; (ii) a passive wavelength router (e.g., an arrayed waveguide grating, AWG); or (iii) any suitable combination of wavelength-insensitive and/or wavelength-sensitive passive optical elements, e.g., a 1×M AWG optical splitter with individual optical splitters on one or more of the M downstream optical ports thereof. A typical router 130 has (N+1) optical ports, including a single port 128 at its first or upstream side and a set of N ports $132_1$-$132_N$ at its second or downstream side. Herein, the term "side" is used in an abstract sense to indicate "upstream" or "downstream"

directions rather than in a physical-orientation sense. Port 128 is internally optically connected to each of ports $132_1$-$132_N$. Port 128 is externally optically connected to optical fiber 124 as indicated in FIG. 1. Ports $132_1$-$132_N$ are externally optically connected to ONUs $160_1$-$160_N$, respectively, e.g., via optical fibers $134_1$-$134_N$, as further indicated in FIG. 1, or via more complex, passive optical-fiber networks. Example devices that can be used to implement router 130 are disclosed, e.g., in U.S. Pat. No. 8,923,672, which is incorporated herein by reference in its entirety. Optical fibers $134_1$-$134_N$ and/or the corresponding optical paths between ports $134_1$-$134_N$ and ONUs $160_1$-$160_N$ typically have different respective lengths and/or are characterized by different respective optical losses therein.

In an example embodiment, each of ONUs $160_1$-$160_N$ includes a respective optical circulator 162 or other suitable directional optical coupler, a respective optical data transmitter 164, and a respective optical data receiver 166. Optical circulator 162 is configured to (i) direct downstream signals received from passive router 130 to optical receiver 166 and (ii) direct upstream signals from optical transmitter 164 to router 130. Example features of ONU $160_n$ are described below in reference to FIGS. 2-4.

In an example commercial application, system 100 can be configured to operate such that all downstream signals are spectrally located in a spectral band near 1.55 μm, and all upstream signals are spectrally located in a spectral band near 1.3 μm, or vice versa. In such cases, all or some of optical circulators 120 and 162 may be replaced by respective optical band-pass or dichroic optical filters.

While FIG. 1 illustrates a PON with a single passive optical router 130, more-complex PON architectures are also possible, such as PON architectures having multiple passive optical routers and tree-and-branch sub-topologies.

In some embodiments, ONUs $160_1$-$160_N$ may be divided into two or more non-overlapping ONU groups, e.g., as described in the above-cited U.S. Pat. No. 8,923,672.

Figure 2:
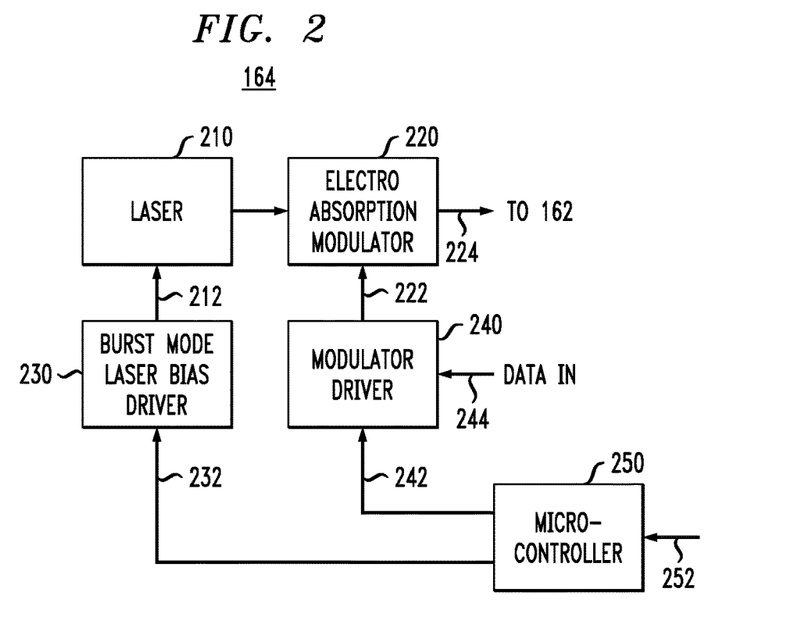
FIG. 2 shows a block diagram of an optical transmitter that can be used in an ONU of the PON system of FIG. 1 according to an embodiment.

FIG. 2 shows a block diagram of optical transmitter 164 according to an embodiment. As shown in FIG. 2, optical transmitter 164 comprises an EML including a laser diode 210 and an EAM 220. An optical output signal 224 generated by EAM 220 can be directed, e.g., to optical circulator 162 (also see FIG. 1). Operational control of laser diode 210 and EAM 220 is carried out using an electronic controller 250 and driver circuits 230 and 240. Example driver circuits that can be used to implement driver circuits 230 and 240 are disclosed, e.g., in U.S. Pat. Nos. 9,614,351, 10,148,357, and 10,461,882, all of which are incorporated herein by reference in their entirety.

Controller 250 operates to generate control signals 232 and 242 in response to a control signal 252 received, e.g., from optical receiver 166 of the same ONU. Control signal 232 is used to set and/or change one or more bias voltages and/or currents 212 generated by driver circuit 230 for laser diode 210. Control signal 242 is used to set and/or change the RF-swing amplitude(s) of one or more drive voltages 222 generated by driver circuit 240 for EAM 220. A drive voltage 222 having the RF-swing amplitude selected based on control signal 242 has a waveform corresponding to a data signal 244, which causes the corresponding data stream to be imprinted onto the optical output signal 224. Depending on the embodiment, controller 250 can be programmed to use control signals 232 and 242 to control one or both of: (i) the extinction ratio of optical output signal 224; and (ii) the optical power of optical output signal 224. As a result, one or both of the OMA and average optical power of the optical output signal 224 can be controlled using control signals 232 and 242, e.g., as indicated by Eqs. (1)-(5). Thus, control signals 232 and 242 can be used to control the OMA level and/or average-optical-power level received, from optical transmitter 164, at the corresponding remote optical receiver, e.g., at optical receiver 114 of OLT 110 (FIG. 1).

Control signal 252 can be generated by optical receiver 166, e.g., as described in more detail below in reference to FIGS. 4-7. For example, control signal 252 can be generated based on control messages received from OLT 110 and/or can be based on an optical channel estimate obtained by optical receiver 166 from measurements of the downstream optical data signal received from OLT 110 (also see FIG. 1).

Figure 3:
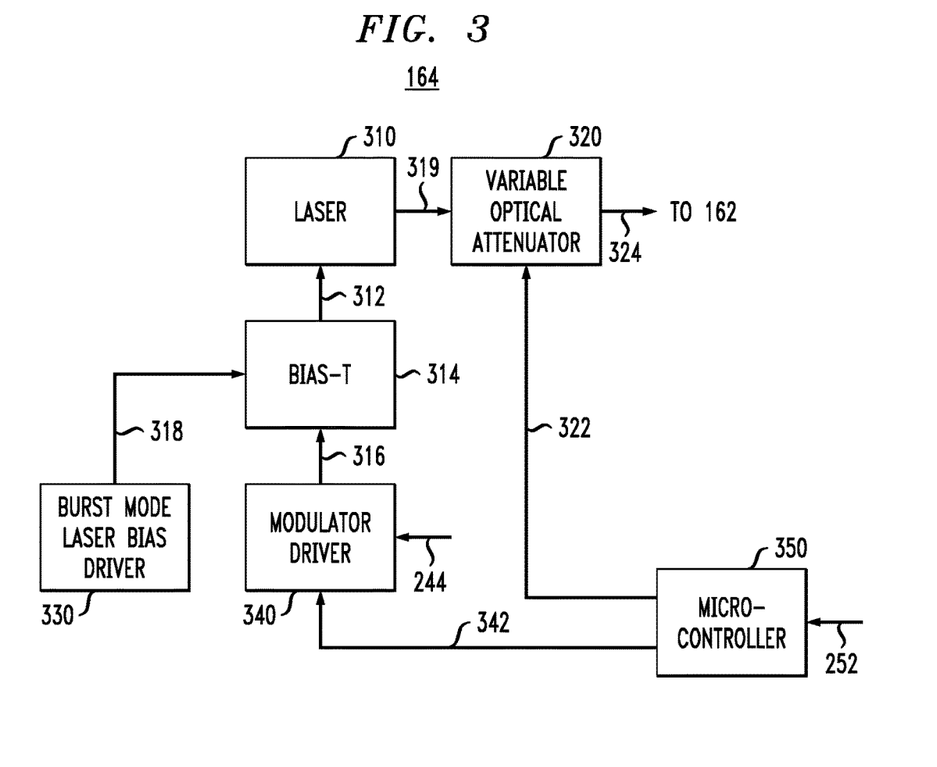
FIG. 3 shows a block diagram of an optical transmitter that can be used in an ONU of the PON system of FIG. 1 according to another embodiment.

FIG. 3 shows a block diagram of optical transmitter 164 according to another embodiment. As shown in FIG. 3, optical transmitter 164 comprises a DML 310 and a variable optical attenuator (VOA) 320. An optical output signal 324 generated using DML 310 and VOA 320 can be directed, e.g., to optical circulator 162 (also see FIG. 1). Operational control of DML 310 is carried out using an electronic controller 350 and driver circuits 330 and 340. Example driver circuits that can be used to implement driver circuits 330 and 340 are disclosed, e.g., in U.S. Pat. Nos. 6,587,489, 6,901,091, 7,068,691, 8,903,254, and 10,790,636, all of which are incorporated herein by reference in their entirety. Operational control of VOA 320 is carried out using electronic controller 350. In some embodiments, VOA 320 may be absent.

Controller 350 operates to generate control signals 322 and 342 in response to the above-mentioned control signal 252 (also see FIG. 2). Control signal 342 is used to set and/or change the RF-swing amplitude of a drive signal 316 generated by driver circuit 340 for DML 310. Drive signal 316 having the RF-swing amplitude selected based on control signal 342 has a waveform corresponding to data signal 244, which causes the corresponding data stream to be imprinted onto an optical output signal 319 generated by DML 310. An electrical signal combiner (e.g., a bias-T) 314 operates to appropriately combine the drive signal 316 generated by driver circuit 340 and a bias signal 318 generated by driver circuit 330, thereby generating a combined drive signal 312 applied to DML 310. Control signal 322 is used to set and/or change the optical-signal attenuation imparted onto optical signal 319 by VOA 320. The resulting attenuated signal is optical output signal 324. Controller 350 can be programmed to use control signal 342 to control the extinction ratio of optical output signals 319 and 324. Controller 350 can be further programmed to use control signal 322 to control the optical power of optical output signal 324. As a result, one or both of the OMA and average optical power of the optical output signal 324 can be controlled using control signals 322 and 342, e.g., as indicated by Eqs. (1)-(5).

Figure 4:
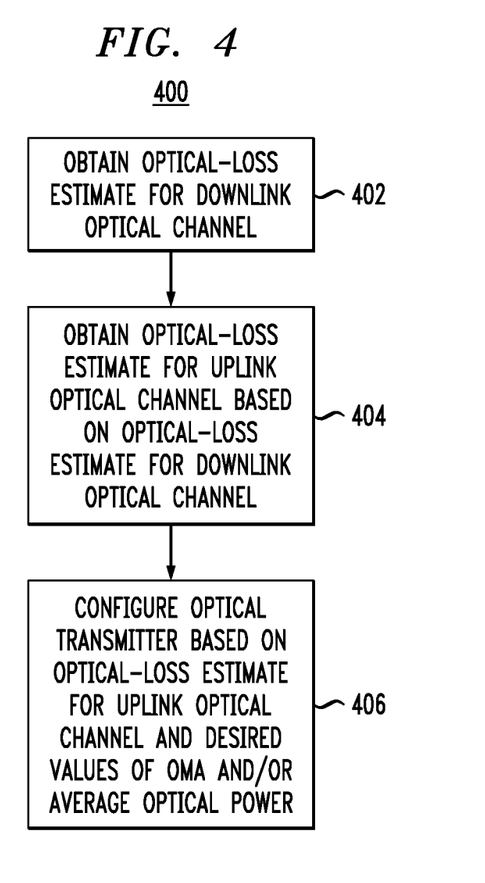
FIG. 4 shows a flowchart of a control method that can be implemented at an ONU of the PON system of FIG. 1 according to an embodiment.

FIG. 4 shows a flowchart of a control method 400 that can be implemented at ONU $160_n$ of FIG. 1 according to an embodiment. Method 400 can be used, e.g., to change one or both of the OMA and average optical power of optical output signal 224 or 324, thereby adjusting the OMA and/or average optical power, received at the remote optical receiver 114 of OLT 110, toward a target value. An example embodiment of method 400 can be implemented solely based on the processing performed at ONU $160_n$, i.e., such an embodiment of method 400 does not rely on control messaging between ONU $160_n$ and OLT 110.

At step 402 of method 400, optical receiver 166 operates to obtain an optical-loss estimate for the downstream optical channel, i.e., for optical transmission from OLT 110 to ONU $160_n$ (also see FIG. 1). The optical-loss estimate can be obtained by measuring certain characteristics of the received downstream optical signal, e.g., as follows.

In one example embodiment, step 402 may comprise the sub-steps of: (a) measuring the Received Signal Strength Indicator (RSSI) corresponding to the received downstream optical signal; and (b) computing an optical-loss estimate for the downstream optical channel. For sub-step (a), the electrical output(s) of the photodetector of optical receiver 166 can be processed as known in the pertinent art to obtain the corresponding RSSI value. For step (b), the optical power of the downstream optical signal at OLT 110 can be assumed, e.g., to have a value listed in the technical specification for this particular PON installation. Typically, such an assumption can be relatively accurate, as the light sources employed at OLT 110 are typically configured in accordance with the technical specification and are relatively stable. A person of ordinary skill in the pertinent art will readily understand that, based on the RSSI measured at sub-step (a) and the assumed optical launch power of the OLT, an optical-loss estimate for the downstream optical channel can be computed in a straightforward manner.

In another example embodiment, step 402 may comprise the sub-steps of: (i) measuring the signal-to-noise ratio (SNR) corresponding to the received downstream optical signal; and (ii) computing an optical-loss estimate for the downstream optical channel. Many optical receivers usable as optical receiver 166 readily support such SNR measurements and are capable of performing sub-step (i) without any modifications. For step (ii), the SNR value obtained at sub-step (i) can be converted into an estimate of the received optical power, as the two values are related to one another in a known manner. Then, an optical-loss estimate for the downstream optical channel can be computed as a ratio of the estimate of the received optical power and the assumed optical launch power of OLT 110.

At step 404, the optical-loss estimate computed at step 402 is converted into an optical-loss estimate for the upstream optical channel. The conversion may include, e.g., an adjustment of the optical-loss estimate computed at step 402 for the wavelength difference between the upstream and downstream optical channels, as the optical loss is typically wavelength dependent. The conversion may also include, e.g., further adjustment for any front-end-related loss differences between optical transmitter 164 and optical receiver 166, etc. The optical-loss estimate computed at step 404 may then be provided to controller 250 or 350 via control signal 252 (FIGS. 2, 3).

At step 406, the corresponding controller 250, 350 operates to generate appropriate control signals 232, 242 or 322, 342 to cause the optical output signal 224 or 324 to provide approximately, at the remote optical receiver, target values of the OMA and/or average optical power. In an example embodiment, step 406 can be implemented using a preprogrammed look-up table (LUT), wherein corresponding sets of configuration parameters for the circuit of FIG. 2 or 3 are stored for different optical-loss values and for different target values of the OMA and average optical power.

In an example embodiment of system 100, the ONU control, operation, and management information can be carried over at least three different channels: (i) the embedded operation, administration and maintenance (OAM) channel; (ii) the physical layer OAM (PLOAM) messaging channel; and (iii) the ONU management and control channel (OMCC). These channels are described in more detail, e.g., in Recommendation ITU-T G.9804.2, "Higher Speed Passive Optical Networks: Common Transmission Convergence Layer Specification," which is incorporated herein by reference in its entirety. While any of these three channels may be used to communicate control messages needed for some embodiments, the PLOAM messaging channel or OMCC channel may be preferred for these purposes, e.g., because the corresponding communications instances are relatively infrequent. For illustration purposes and without any implied limitations, example embodiments are described herein below in reference to the PLOAM channel. Based on the provided description, a person of ordinary skill in the art will readily understand, without any undue experimentation, how to use other ones of the above-indicated channels for similar purposes.

Implementations of the PLOAM channel are typically flexible, which enables accommodation of future enhancements in a backward-compatible way. The PLOAM channel termination operates to receive, process, and respond to messages. In some cases, the response needs to come relatively quickly (e.g., within 750 microseconds), and some cases may require the corresponding triggering of other actions in a precisely timed way. For such cases, it may be advantageous to implement the corresponding processing in hardware, e.g., using an ASIC. However, it is preferred for such hardware to be implemented in a somewhat flexible way, with some programmability allowed in the definition of messages and their associated actions. In some other cases, there may be no significant time urgency to the handling of the PLOAM interaction. For such cases, recommended implementations of the PLOAM channel termination function may be able to perform the processing of non-urgent messages in a general-purpose processor and may be extensible by a software upgrade. Furthermore, typical implementations of the PLOAM processing function are able to accommodate the definition of new messages and are able to handle such new messages gracefully.

Figure 5A:
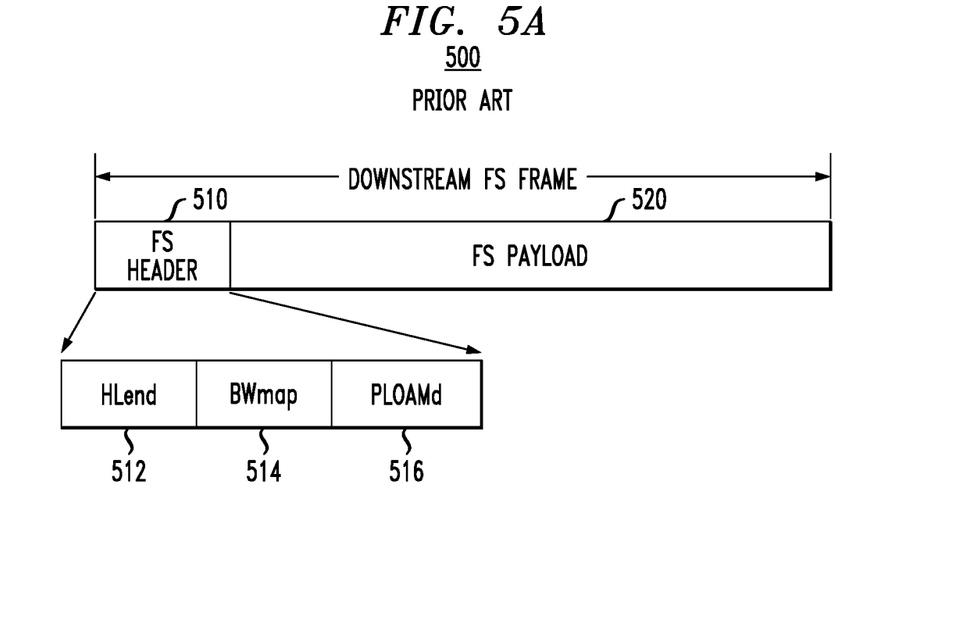
FIGS. 5A-5B pictorially show conventional downstream and upstream frame formats that can be used in the PON system of FIG. 1.

FIG. 5A pictorially shows a conventional downstream framing-sublayer (FS) frame format that can be used in system 100. More specifically, FIG. 5A shows a downstream FS frame 500 comprising a downstream FS header 510 and an FS payload 520. The FS payload 520 is formed at OLT 110 and is processed at ONU 160$_n$ by the corresponding Common Transmission Convergence (ComTC) service adaptation sublayer entity. Header 510 comprises a fixed-size HLend structure 512 and two variable-size partitions, i.e., a bandwidth map partition (BWmap) 514 and a downstream PLOAM partition (PLOAMd) 516. A more-detailed description of various parts of frame 500 can be found, e.g., in clause 8 of the above-cited Recommendation ITU-T G.9804.2.

Figure 5B:
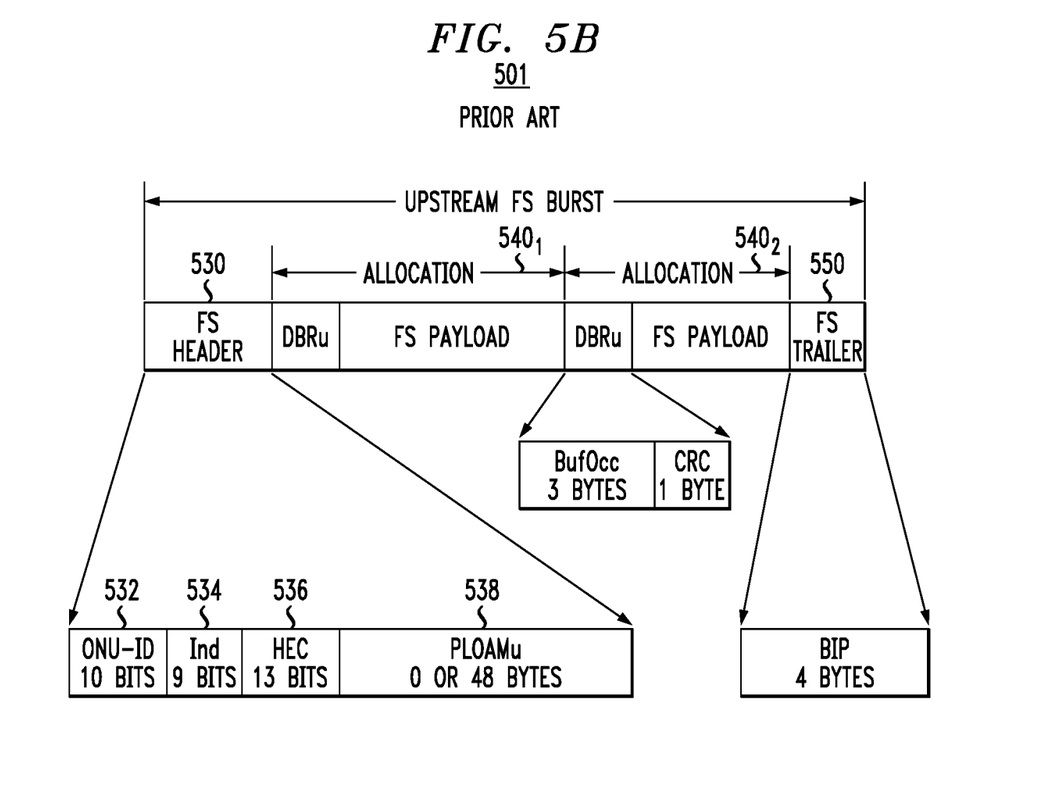

FIG. 5B shows a conventional upstream FS burst 501 comprising an upstream FS burst header 530, one or more bandwidth allocation intervals 540, and an FS trailer 550. Upstream FS burst 501 transmitted by a given ONU 160$_n$ has a dynamically determined size. As an example, two bandwidth allocation intervals 540, labeled 540$_1$ and 540$_2$, are shown in FIG. 5B. The size of each allocation interval 540 is dictated by a specific allocation structure of the corresponding BWmap.

Upstream FS header 530 includes a 4-byte fixed section and a non-fixed section. The fixed section has an ONU-ID field 532, an Ind field 534, and a Header Error Control/Check (HEC) field 536. The non-fixed section has either a zero byte length or a 48-byte upstream PLOAM (PLOAMu) message 538, depending on the value of the PLOAMu flag of the corresponding BWmap allocation structure. If present, PLOAMu field 538 contains exactly one upstream PLOAM message. The presence/absence of the PLOAMu message is controlled by the OLT channel termination with the PLOAMu flag of the first allocation structure in the burst allocation series. A more-detailed description of various parts of upstream FS burst 501 can be found, e.g., in clause 8 of Recommendation ITU-T G.9804.2.

According to example embodiments, downstream FS frame 500 and/or upstream FS burst 501 can be enhanced and/or modified to support OMA leveling, e.g., as described below.

Figure 6:
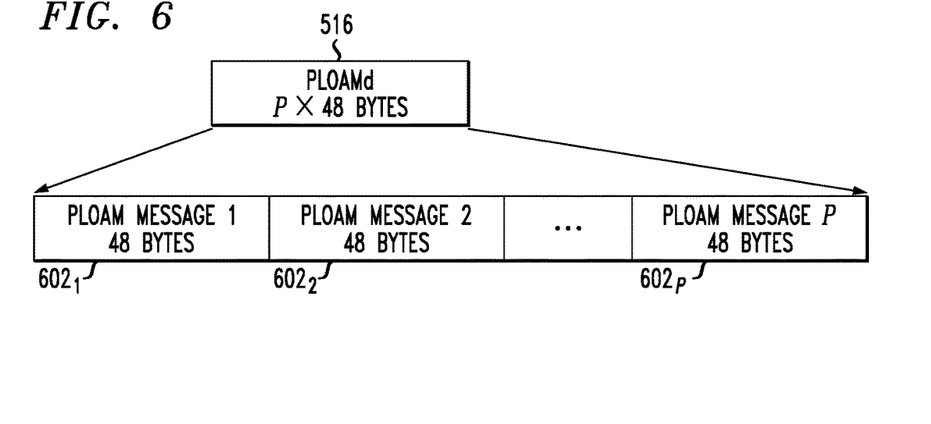
FIG. 6 pictorially shows the PLOAMd partition of a downstream frame according to an embodiment.

FIG. 6 pictorially shows PLOAMd partition 516 according to an embodiment. PLOAMd partition 516 may contain zero, one, or more PLOAM messages 602. The length of each PLOAM message 602 is 48 bytes. The number P of PLOAM messages in PLOAMd partition 516 is given by the PLOAM count field of HLend structure 512 (FIG. 5A). The total length of PLOAMd partition 516 is 48×P bytes. The format that can be used for PLOAM messages $602_1$-$602_P$ and the constraints on the PLOAM messaging channel are specified in clause 11 of the above-cited Recommendation ITU-T G.9804.2.

Figure 7:
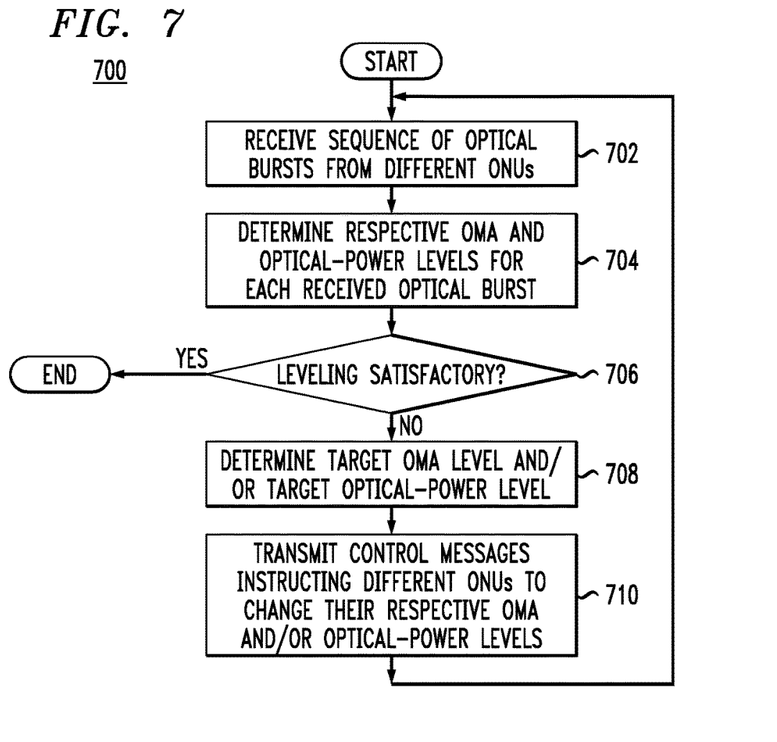
FIG. 7 shows a flowchart of a control method that can be implemented at an OLT of the PON system of FIG. 1 according to an embodiment.

For example, PLOAM message $602_1$ can be a "Change Power Level" message, which is listed in Table 11-3 of the Recommendation ITU-T G.9804.2 under message type ID 0x1A. The function of such PLOAM message $602_1$ is to instruct the corresponding ONU $160_n$ to change and/or to report its launch optical power level. Transmission of such PLOAM message $602_1$ by OLT 110 can be triggered by any of a plurality of different triggers, which may include, e.g., step 710 of method 700 (FIG. 7). In response to such PLOAM message $602_1$, ONU $160_n$ operates to adjust its optical launch power as instructed and then send a corresponding Acknowledgement PLOAM message 538.

PLOAM message $602_2$ can be a "Get Set Capabilities" message, which is listed in Table 11-3 of Recommendation ITU-T G.9804.2 under message type ID 0x1F. Such PLOAM message $602_2$ is a unicast message to query ONU $160_n$ on its feature support, or to set an ONU's feature setting. According to an example embodiment, a "Get Set Capabilities" message can be enhanced by defining fields specific to OMA leveling. For example, such definition may be similar to the definition of the Attenuation parameter provided in clause 11.2.6.7 of Recommendation ITU-T G.9804.2. In response to such a PLOAM message $602_2$, ONU $160_n$ may adjust its OMA level if the bit-field 'S' in octet 5 is set to '1', and then send an "ONU Capabilities" message 538 that is enhanced by defining fields specific to OMA leveling.

PLOAM message $602_P$ can be a "Change OMA Level" message, which is a new PLOAMd message type according to an embodiment. The function of such PLOAM message $602_P$ is to instruct the corresponding ONU $160_n$ to change and/or to report its OMA level and/or OMA leveling capabilities. The "Change OMA Level" message may be defined, e.g., in a manner similar to the definition of the "Change Power Level" message, which is listed in Table 11-3 of the Recommendation ITU-T G.9804.2 under message type ID 0x1A. Transmission of such PLOAM message $602_P$ by OLT 110 can be triggered by any of a plurality of different triggers, which may include, e.g., step 710 of method 700 (FIG. 7). In response to such PLOAM message $602_P$ having a request to change the OMA level, ONU $160_n$ operates to adjust its OMA level as instructed and then send a corresponding Acknowledgement PLOAM message 538. In response to a PLOAM message $602_P$ having a request to report the OMA level or OMA leveling capabilities, ONU $160_n$ may respond with an upstream PLOAM "OMA Level Capabilities" message 538, e.g., having fields defined for OMA leveling capabilities and for the current amount of OMA leveling. Such definition may be similar, e.g., to the definition of the power-leveling capability provided in clause 11.2.6.8 (field 0CCC CCCC) of Recommendation ITU-T G.9804.2 or to the definition of the Attenuation parameter provided in clause 11.2.6.7 of Recommendation ITU-T G.9804.2. The latter PLOAM "OMA Level Capabilities" message 538 is a newly defined message according to an embodiment. A person of ordinary skill in the pertinent art will readily understand that any addition of a newly defined PLOAMd message according to an embodiment is usually accompanied by a corresponding addition of a newly defined PLOAMu message, and vice versa. Some sets of newly defined PLOAM messages may be designed to complement and/or work together with some of the legacy PLOAM messages.

FIG. 7 shows a flowchart of a control method 700 that can be implemented at OLT 110 according to an embodiment. Method 700 can be used, e.g., to change one or both of the OMA level and average optical-power level of the respective optical output signal 224 or 324 at one or more ONUs $160_n$ in a manner that causes OMA leveling and/or average optical-power leveling across a sequence of optical bursts received by OLT 110 from different ones of the ONUs $160_1$-$160_N$.

At step 702 of method 700, OLT 110 receives a sequence of optical bursts from different ones of ONUs $160_1$-$160_N$. As already indicated above, the optical bursts received from different ones of ONUs $160_1$-$160_N$ are typically characterized by different respective OMA levels and optical-power levels at the optical receiver of OLT 110. For example, in some PON systems, different optical paths through the fiber plant (e.g., including 124, 130, $134_1$-$134_N$, FIG. 1) may have respective optical losses that differ by as much as ~15 dB, which typically causes a commensurate spread for the received OMA and optical-power levels at OLT 110.

At step 704, OLT 110 operates to determine the respective received OMA and optical-power levels for each of the optical bursts received at step 702. Example embodiments of step 704 may rely on one or more of: (i) RSSI measurements at OLT 110; (ii) SNR measurements at OLT 110; and (iii) tracking of the post-amplifier gain settings in receiver 114 of OLT 110 during initialization and/or after settling.

At step 706, OLT 110 operates to determine whether or not the ranges of the received OMA levels and/or optical-power levels determined at step 706 are satisfactory. In an example embodiment, the determination of step 706 may include comparing the difference between the highest received OMA level and the lowest received OMA level with a first threshold value. Depending on the embodiment, the first threshold value can be selected to be, e.g., 5 dB, 3 dB, 1 dB, or even smaller than 1 dB. The determination of step 706 may further include comparing the difference between the highest received average optical-power level and the lowest received average optical-power level with a second threshold value. Depending on the embodiment, the second threshold value can be selected to be, e.g., 5 dB, 3 dB, 1 dB, or even smaller. The first and second threshold values may be the same or different.

If the difference between the highest and lowest received OMA levels, at OLT 110, exceeds the first threshold value or the difference between the highest and lowest received average optical-power levels exceeds the second threshold value, then the processing of method 700 is directed to step 708. Otherwise, the processing of method 700 is terminated.

At step 708, OLT 110 operates to determine a target received OMA level and/or a target optical-power level for a set of ONUs $160_n$. In different embodiments, different received target OMA levels may be selected. For example, the target OMA level may be selected to be, e.g., near the lowest received OMA level or near the median of the received OMA levels. The target optical-power level may also depend on the specific embodiment and may also be suitably selected.

At step 710, OLT 110 may operate to transmit control messages instructing different ONUs $160_n$ to change their respective OMA levels to the levels selected such that, at OLT 110, the resulting spread of the received OMA levels around the target value becomes smaller than the first threshold value of step 706. Such control messages may be sent to all ONUs $160_1$-$160_N$ or only to some of the ONUs, e.g., to the ONUs that failed the corresponding thresholding criterion of step 706. In an example, embodiment such control messages may be PLOAMd messages 602, e.g., similar to the above-described "Change OMA Level" PLOAMd message $602_P$ of FIG. 6.

OLT 110 may further operate to transmit control messages instructing different ONUs $160_n$ to change their respective average optical-power levels to the levels selected such that, at OLT 110, the resulting spread of the received average optical-power levels around the target value becomes smaller than the second threshold value of step 706. Such control messages may be sent to all ONUs $160_1$-$160_N$ or only to some of the ONUs, e.g., to the ONUs that failed the corresponding thresholding criterion of step 706. In an example, embodiment such control messages may be PLOAMd messages 602, e.g., similar to the above-described "Change Power Level" PLOAMd message $602_1$ of FIG. 6. The processing of method 700 may then be directed back to step 702.

Upon receipt of the corresponding control message(s) transmitted by OLT 110 at step 710, the optical receiver 166 of ONU $160_n$ may generate the corresponding control signal 252 for controller 250 or 350 (also see FIGS. 2-3). In response to this control signal 252, controller 250 (or 350) may proceed to generate the corresponding control signals 232, 242 (or 322, 342) as described above.

In some embodiments, method 700 may be implemented on a per-group basis, i.e., only for a subset of ONUs $160_1$-$160_N$ belonging to the same ONU group. In such embodiments, different instances of method 700 may be executed for different ONU groups.

Figure 8:
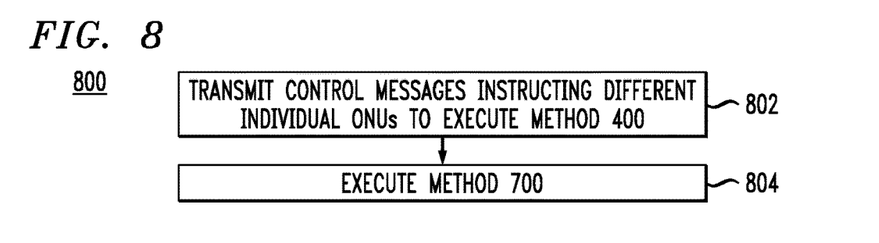
FIG. 8 shows a flowchart of a control method that can be implemented at an OLT of the PON system of FIG. 1 according to another embodiment.

FIG. 8 shows a flowchart of a control method 800 that can be implemented at OLT 110 according to another embodiment. Method 800 relies on method 400 for coarse adjustment of OMA and optical-power levels received by OLT 110 from individual ones of ONUs $160_1$-$160_N$. This coarse adjustment is then followed by a finer adjustment implemented using method 700.

At step 802 of method 800, OLT 110 operates to transmit control messages instructing different individual ONUs $160_n$ to execute method 400.

At step 804 of method 800, OLT 110 proceeds to execute method 700 as described above. Step 804 can be triggered, e.g., upon receipt of proper acknowledgements from the ONUs indicating completion of the method 400 or based on a timer configured to count down the selected wait time after the message transmissions of step 802.

According to an example embodiment disclosed above, e.g., in the summary section and/or in reference to any one or any combination of some or all of FIGS. 1-8, provided is an apparatus, comprising an optical line terminal (e.g., 110, FIG. 1) to optically communicate with a plurality of optical network units (e.g., $160_1$-$160_N$, FIG. 1), the optical line terminal including an optical data receiver (e.g., 114, FIG. 1) to receive a sequence of optical bursts from different ones of the optical network units, and further including an optical data transmitter (e.g., 112, FIG. 1); and wherein the optical data transmitter is operable to transmit (e.g., at 710, FIG. 7) first control messages (e.g., $602_P$, FIG. 6) to individual ones of the optical network units, each of the first control messages enabling a respective one of the optical network units to change an optical-modulation-amplitude (OMA) level thereat such that, at the optical line terminal, differences between OMA levels of the optical bursts received from the different ones of the optical network units become smaller than a first threshold value (e.g., 706, FIG. 7).

In some embodiments of the above apparatus, the first threshold value is selectable and is smaller than 5 dB (or smaller than 3 dB, or smaller than 1 dB).

In some embodiments of any of the above apparatus, the optical data transmitter is operable to transmit (e.g., at 710, FIG. 7) second control messages (e.g., $602_1$, FIG. 6) to individual ones of the optical network units, each of the second control messages enabling a corresponding one of the optical network units to change an optical launch power thereat such that, at the optical line terminal, differences between average optical-power levels of the optical bursts received from the different ones of the optical network units become smaller than a second threshold value (e.g., 706, FIG. 7).

In some embodiments of any of the above apparatus, the apparatus further comprises a passive optical router (e.g., 130, FIG. 1) having a first optical port and a plurality of second optical ports, the first optical port being fiber-connected to the optical line terminal, and each of the second optical ports being fiber-connected to at least one of the optical network units.

In some embodiments of any of the above apparatus, the optical data transmitter is further operable to transmit payload data (e.g., 520, FIG. 5) to the optical network units.

In some embodiments of any of the above apparatus, a first optical network unit of the plurality of optical network units comprises a burst-mode optical data transmitter (e.g., 164, FIGS. 1-3); and wherein, in response to a corresponding one of the first control messages, the burst-mode optical data transmitter is reconfigured (e.g., using 242, FIG. 2) to change an extinction ratio of a modulated optical data signal generated thereby for transmission to the optical data receiver.

In some embodiments of any of the above apparatus, the burst-mode optical data transmitter comprises an electro-absorption modulator (e.g., 220, FIG. 2).

In some embodiments of any of the above apparatus, the burst-mode optical data transmitter comprises a directly modulated laser (e.g., 310, FIG. 2).

In some embodiments of any of the above apparatus, the first control messages are transmitted by one of an embedded operation, administration and maintenance (OAM) channel; a physical layer OAM messaging channel; and an optical-network-unit management and control channel.

In some embodiments of any of the above apparatus, responses to the first control messages are received from the optical network units by one of the embedded OAM channel; the physical layer OAM messaging channel; and the optical-network-unit management and control channel.

In some embodiments of any of the above apparatus, the optical data receiver is capable of measuring (e.g., at 704, FIG. 7) the received OMA levels of individual ones of the optical bursts of the sequence.

According to another example embodiment disclosed above, e.g., in the summary section and/or in reference to any one or any combination of some or all of FIGS. 1-8, provided is an apparatus comprising an optical network unit (e.g., 160$_n$, FIG. 1) including an optical transmitter (e.g., 164, FIG. 1) and a first optical receiver (e.g., 166, FIG. 1) and being configured to communicate with a remote optical line terminal (e.g., 110, FIG. 1) of a burst-mode, passive optical network (e.g., 100, FIG. 1); and wherein the optical network unit is configured to adjust the optical transmitter during or near optical transmission therefrom to approximately set an optical modulation amplitude of the optical transmitter received at the remote optical line terminal to a target value.

In some embodiments of the above apparatus, the approximately set optical modulation amplitude is within 5 dB (or 3 dB) of the target value.

In some embodiments of any of the above apparatus, the optical network unit is configured to dynamically evaluate a temporal series of values of a quantity representative of the optical modulation amplitude of the optical transmitter during optical transmission therefrom.

In some embodiments of any of the above apparatus, the optical network unit is configured to approximately set the optical modulation amplitude based on the evaluated values of the quantity.

In some embodiments of any of the above apparatus, the apparatus is configured to select a same target value for a plurality of optical network units configured to communicate with the remote optical line terminal.

In some embodiments of any of the above apparatus, the optical network unit is configured to perform the OMA adjustment in response to a control message received from the remote optical line terminal.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising an optical line terminal operable to optically communicate with a plurality of optical network units, the optical line terminal including an optical data receiver operable to receive a sequence of optical bursts from different ones of the optical network units, and further including an optical data transmitter; and
wherein the optical data transmitter is operable to transmit first control messages to individual ones of the optical network units, each of the first control messages enabling a respective one of the optical network units to change an optical-modulation-amplitude (OMA) level thereat such that, at the optical line terminal, differences between OMA levels of the optical bursts received from the different ones of the optical network units become smaller than a first threshold value, wherein the OMA level at a respective one of the optical network units is based on differences in optical-power levels for different data symbols in the optical bursts transmitted by the respective one of the optical network units.

2. The apparatus of claim 1, wherein the first threshold value is selectable by the optical line terminal and is smaller than 5 dB.

3. The apparatus of claim 1, wherein the optical data transmitter is operable to transmit second control messages to individual ones of the optical network units, each of the second control messages enabling a corresponding one of the optical network units to change an optical launch power thereat such that, at the optical line terminal, differences between average optical-power levels of the optical bursts received from the different ones of the optical network units become smaller than a second threshold value.

4. The apparatus of claim 1, further comprising a passive optical router having a first optical port and a plurality of second optical ports, the first optical port being fiber-connected to the optical line terminal, and each of the second optical ports being fiber-connected to at least one of the optical network units.

5. The apparatus of claim 1, wherein the optical data transmitter is further operable to transmit payload data to the optical network units.

6. The apparatus of claim 1, wherein:
data is encoded into the optical bursts using OOK modulation having ON data symbols and OFF data symbols; and
the OMA levels are based on differences in respective ON and OFF optical-power levels for the ON and OFF data symbols in the optical bursts transmitted by the optical network units.

7. The apparatus of claim 1, wherein the first control messages are transmitted by one of an embedded operation, administration and maintenance (OAM) channel; a physical layer OAM messaging channel; and an optical-network-unit management and control channel.

8. The apparatus of claim 7, wherein responses to the first control messages are received from the optical network units by one of the embedded OAM channel; the physical layer OAM messaging channel; and the optical-network-unit management and control channel.

9. The apparatus of claim 1, wherein the optical data receiver is capable of measuring the received OMA levels of individual ones of the optical bursts of the sequence.

10. An apparatus, comprising
an optical network unit including an optical transmitter and an optical receiver and being configured to communicate with a remote optical line terminal of a burst-mode, passive optical network; and
wherein the optical network unit is configured to adjust an OMA level of the optical transmitter to approximately set an optical modulation amplitude of optical bursts being received at the remote optical line terminal to a target value, wherein the OMA level of the optical transmitter is based on differences in optical-power levels for different data symbols in the optical bursts transmitted by the optical network unit.

11. The apparatus of claim 10, wherein:
the optical network unit is operable to encode data into the optical bursts using OOK modulation having ON data symbols and OFF data symbols; and
the OMA levels are based on differences in respective ON and OFF optical-power levels for the ON and OFF data symbols in the optical bursts transmitted by the optical network unit.

12. The apparatus of claim 10, wherein the approximately set optical modulation amplitude is within 5 dB of the target value.

13. The apparatus of claim 10, wherein the optical network unit is configured to dynamically evaluate a temporal series of values of a quantity representative of the optical modulation amplitude of the optical transmitter during optical transmission therefrom.

14. The apparatus of claim 13, wherein the optical network unit is configured to approximately set the optical modulation amplitude based on the evaluated values of the quantity.

15. The apparatus of claim 10, wherein the optical network unit is configured to perform the adjustment in response to a control message received from the remote optical line terminal.

16. The apparatus of claim 15, wherein the optical transmitter is a burst-mode optical data transmitter; and
wherein, in response to the control message, the burst-mode optical data transmitter is reconfigured to change an extinction ratio of a modulated optical data signal generated thereby for transmission to the remote optical line terminal.

17. The apparatus of claim 16, wherein the burst-mode optical data transmitter comprises an electro-absorption modulator.

18. The apparatus of claim 16, wherein the burst-mode optical data transmitter comprises a directly modulated laser.

19. The apparatus of claim 10, wherein the optical network unit is further configured to adjust an optical launch power of the optical bursts transmitted by the optical transmitter.

20. A burst-mode, passive optical network comprising an optical line terminal connected to optically communicate with a plurality of optical network units, wherein:
the optical line terminal is operable to transmit a first control message to one of the optical network units to change an OMA level of optical bursts transmitted by the optical network unit to the optical line terminal, wherein the OMA level is based on differences in optical-power levels for different data symbols in the optical bursts transmitted by the optical network unit; and
the optical network unit is operable to receive the first control message and, in response, change the OMA level of the optical bursts transmitted by the optical network unit to the optical line terminal.

21. The burst-mode, passive optical network of claim 20, wherein the optical line terminal is configured to set a same target value for the OMA levels of the optical bursts received from the plurality of optical network units configured to communicate with the remote optical line terminal.

22. The burst-mode, passive optical network of claim 20, wherein:
the optical line terminal is operable to transmit a second control message to the optical network unit to change an optical launch power of the optical bursts transmitted by the optical network unit to the optical line terminal; and
the optical network unit is operable to receive the second control message and, in response, change the optical launch power of the optical bursts transmitted by the optical network unit to the optical line terminal.

23. The burst-mode, passive optical network of claim 20, wherein:
the optical network unit is operable to encode data into the optical bursts using ON/OFF Keying (OOK) modulation having ON data symbols and OFF data symbols; and
the OMA levels are based on differences in respective ON and OFF optical-power levels for the ON and OFF data symbols in the optical bursts transmitted by the optical network unit.

* * * * *